Oct. 6, 1953     W. T. HONISS     2,654,185
MOLTEN GLASS FEEDER SPOUT
Filed Dec. 21, 1949
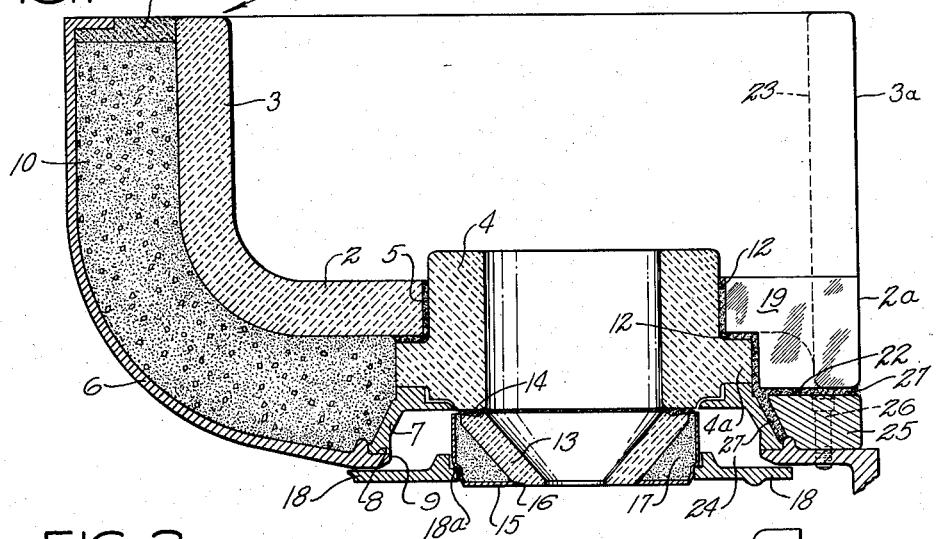
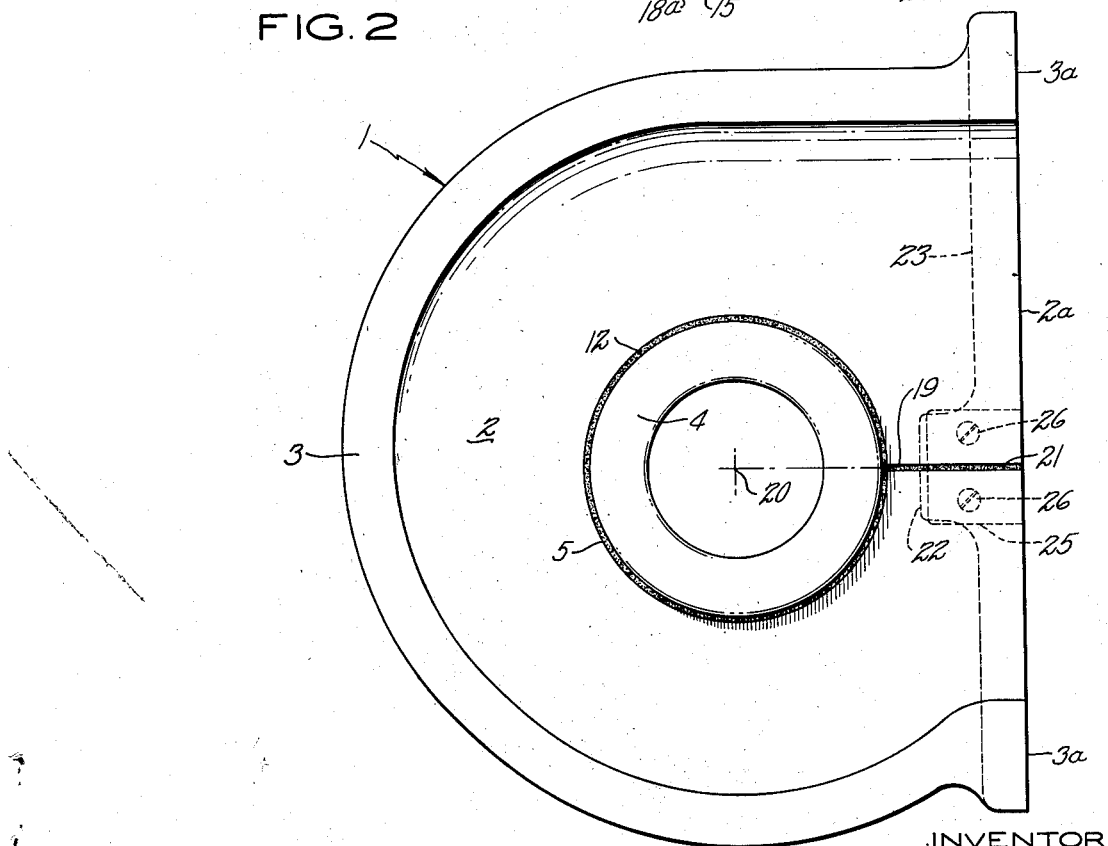
INVENTOR
WILLIAM T. HONISS
BY Parham + Bates
ATTORNEYS Patented Oct. 6, 1953

2,654,185

UNITED STATES PATENT OFFICE 2,654,185

MOLTEN GLASS FEEDER SPOUT

William T. Honiss, West Hartford, Conn., assignor to Emhart Manufacturing Company, a corporation of Delaware Application December 21, 1949, Serial No. 134,253

4 Claims. (Cl. 49—55)

This invention relates generally to improvements in molten glass feeders of the type having a spout provided with a glass feed outlet in its bottom, and more particularly to an improved feeder spout having a refractory bowl which is less likely to crack when heated from room temperature to working temperature than the bowls of prior spouts and moreover is provided with means to render less harmful than in prior spouts any leakage of glass from its glass-supporting refractory bowl.

A molten glass feeder of the character described customarily has a spout operatively positioned at the outer end of a molten glass flow channel of a forehearth which supplies it with molten glass. In service, the molten glass in the spout bowl is maintained at a high temperature which may be in the order of 2000° F. or higher. In heating prior refractory feeder spout bowls from room to service temperature, they are likely to crack. The cracks thus produced may occur anywhere and since the bottom portions of such bowls are comparatively thin and insulated, glass leaks through and eventually flows down around the orifice rings. These are separately formed and are supported in metal holders against the bottoms of the outlet portions of the spout bowls. Leaking glass coming into contact with the metal holder of such an orifice ring will "freeze," i. e., solidify and form a dense surrounding mass of glass which must be chipped away to permit removal of the orifice ring and its replacement. This has been a time-consuming, tedious task and is undesirable and uneconomical since frequent removal and replacement of orifice rings are ordinary incidents of feeder operation.

An object of the invention is to provide a glass feeder refractory spout bowl which is less vulnerable to cracking than prior spout bowls when being heated from room temperature up to operating temperature.

A further object of the invention is to obviate freezing of the orifice ring of the spout in place by glass leaking from the spout bowl and solidifying around the orifice ring.

Other objects and advantages of the invention hereinafter will be pointed out or will become apparent from the following description of a glass feeder spout embodying the invention, as shown in the accompanying drawings, in which:

Figure 1 is a longitudinal vertical section through the spout; and

Fig. 2 is a plan view of the refractory spout bowl with a cooperative underlying metal block or lug shown in dotted lines.

In the drawings, the numeral 1 generally designates a refractory spout bowl comprising integrally formed bottom and side wall portions respectively designated 2 and 3. The side wall 3 of the spout bowl is generally U-shaped as viewed in plan, the bowl being open at its rearward end where the ends, 3a, of its side wall may be vertical and flush with the rear edge, 2a, of the bowl bottom 2. The bowl thus is adapted to be joined at its open rearward end to the open forward end of a suitable molten glass flow channel (not shown) as is usual in glass feeder structures.

The spout bowl has a vertical bottom outlet wall 4 which in the example shown has been formed as a separate refractory bushing of sufficient length to project both above and below the upper and lower surfaces, respectively, of the surrounding portion of the bowl bottom 2 when such bushing is disposed in operative position in an opening 5 which has been formed in the bottom wall 2 to accommodate the bushing. In this position, an external flange 4a on such bushing underlies the portion of the spout bowl bottom wall 2 surrounding the opening 5. The spout bowl is supported in and spaced from a similarly shaped spout casing 6 by the flange 4a on the outlet bushing and a frusto-conical metallic supporting ring 7 which is seated at its lower end at 8 in an annular seat surrounding an opening 9 in the bottom of the spout casing. A suitable refractory insulating material, indicated at 10, is provided to fill the space between the spout bowl 1 and the spout casing 6 and may be covered at the top of this space by a suitable retainer 11 which may be applied in a plastic condition and subsequently harden. Luting, as indicated at 12, is provided between the outlet bushing and the adjacent surfaces of the bowl bottom wall 2.

The spout outlet includes a removable refractory orifice ring 13 of inverted frusto-conical or downwardly tapering shape. This orifice ring is applied to the lower end of the outlet wall 4 and sealed thereto by suitable luting 14. The orifice ring is carried in a dish-shaped metallic holder 15 having an opening in its bottom at 16 to accommodate the extreme lower discharge end of such orifice ring. Heat insulating material 17 fills the holder 15 around the orifice ring therein. The holder 15 is mounted in an annular seat 18a in a support 18. In actual practice, the support 18 usually is a vertically swingable arm for moving the orifice ring holder and its contents to and from its applied position, suitable latching means (not shown) being provided to releasably hold the support 18 in its raised position as shown.

Attention is directed to a saw-cut or slit 19 which has been provided according to the present invention in the bottom wall 2 of the spout bowl from its rearward edge to and through the wall of the opening 5 which accommodates the outlet wall 4. This saw-cut or slit may be in the order of about $\frac{3}{32}$ inch wide in a full size spout bowl and is located approximately intermediate the width of the spout bowl bottom wall. It extends directly toward the bowl outlet center line, indicated at 20 in Fig. 2, in the example shown. The saw-cut or slit is luted with a low expansion refractory cement as indicated at 21.

The saw-cut or slit 19 prevents any tension stress sufficient to cause cracking from building up in the refractory clay of the spout bowl when it is being heated up from room temperature to operating temperature.

I prefer to thicken externally the portion of the refractory bottom wall 2 in which the saw-cut or slit 19 is provided, as by casting or otherwise forming it with an integral boss or lug 22 on its bottom face. This integral boss or lug is merged at its outer end into an external integral rib or flange 23 by which the bottom and side wall portions of the spout bowl may be reinforced or strengthened in accordance with known practice. The lug 22 and, of course, the portion of the integral flange 23 through which the saw-cut or slit is made lengthens the vertical path of possible leakage of molten glass through the saw-cut should the luting cement therein be partially eroded away in service or fail for any reason completely to seal the saw-cut against penetration of molten glass thereinto. The boss or lug 22 has the further use of cooperating with a glass chilling element on the spout casing directly under the slitted portion of the bowl bottom to retard issuance of glass in a fluid state from the bottom of the saw-cut and to effect freezing of any fluid glass leaking through the saw-cut so as to prevent it from flowing to and around the orifice ring holder, as to the space indicated at 24 in Fig. 1. As shown in Fig. 1, the glass chilling element just referred to is an iron block 25 which has been made separate from the casing proper and is secured in place thereon, as by cap screws 26. See also Fig. 2. Luting, as indicated at 27, may be placed between the block 25 and the overlying slitted portion of the spout bowl bottom and may extend between the block and the supporting ring 7. The block 25 may be formed as an integral part of the spout casing.

I claim:

1. A glass feeder spout comprising a refractory bowl having a bottom provided with a downwardly projecting vertical outlet wall at the approximate center thereof and having a slit therein extending from an edge thereof to said outlet wall, a casing means to support said bowl at its outlet wall in said casing so as to be spaced therefrom around the outlet wall, the portion of the bowl bottom containing the slit being spaced above the corresponding portion of the casing, refractory cement luting in said slit, and means located between the bottom of the slit and the underlying portion of the casing to chill any glass leakage through the luted slit.

2. A glass feeder spout comprising a refractory bowl having a bottom provided with a downwardly projecting vertical outlet wall at the approximate center thereof and having a slit therein extending from an edge thereof to said outlet wall, a casing, means to support said bowl at its outlet wall in said casing so as to be spaced therefrom around the outlet wall, the portion of the bowl bottom containing the slit being spaced above the corresponding portion of the casing, refractory cement luting in said slit, and a metallic block on the portion of the casing underlying the slitted portion of the bowl bottom and extending upwardly from the casing relatively close to said slitted portion to chill and prevent further flow of any glass leakage through the luted slit.

3. A glass feeder spout comprising a refractory bowl having integral bottom and side wall portions, said bottom having a central opening formed therein and being provided with a slit extending therein from a marginal edge through the wall of the central opening, a vertical refractory outlet bushing extending through said central opening so as to project therebelow and being luted to the wall of said central opening, a casing, means supporting the bowl by its outlet bushing in said casing in spaced relation therewith around the projecting lower portion of the outlet bushing, refractory luting filling said slit, and a metallic block on a portion of the casing directly beneath the slitted portion of the bowl bottom.

4. A glass feeder spout comprising a refractory bowl having integral bottom and side wall portions, said bottom having a central opening formed therein and being provided with a slit extending therein from a marginal edge through the wall of the central opening, a vertical refractory outlet bushing extending through said central opening so as to project therebelow and being luted to the wall of said central opening, a casing, means supporting the bowl by its outlet bushing in said casing in spaced relation therewith around the projecting lower portion of the outlet bushing, refractory luting filling said slit, and a metallic block on a portion of the casing directly beneath the slitted portion of the bowl bottom, said bowl bottom being thickened locally at the bottom face of the portion thereof provided with said slit and located above said metallic block.

WILLIAM T. HONISS.

References Cited in the file of this patent

UNITED STATES PATENTS

| Number | Name | Date |
|---|---|---|
| 603,330 | Hartman | May 3, 1898 |
| 1,909,152 | Peiler | May 16, 1933 |
| 2,016,382 | McBurney | Oct. 8, 1935 |
| 2,217,182 | Peiler | Oct. 8, 1940 |